Patented Feb. 4, 1941

2,230,266

UNITED STATES PATENT OFFICE 2,230,266

PRODUCTION OF TERPENIC PHENOL-ALDEHYDE RESIN

Israel Rosenblum, New York, N. Y.

No Drawing. Application February 24, 1937, Serial No. 127,518

8 Claims. (Cl. 260—51)

The present invention relates to the production of synthetic resins for use in the manufacture of coating compositions of various kinds, either alone or in conjunction with other synthetic or natural materials, and more particularly to an improved process for obtaining phenolic resins which are readily soluble in varnish oils, and to the resinous compositions so produced.

The present application is a continuation-in-part of my copending applications, Serial No. 594,379, filed February 20, 1932, and Serial No. 751,419, filed November 3, 1934, now Patent No. 2,121,642, dated June 21, 1938.

In a number of my prior applications are described various methods whereby a terpenic material, such as a terpene hydrocarbon and various substitution products of terpene hydrocarbons, are chemically incorporated in a phenol-aldehyde resin whereby not only is the yield of resinous product increased by the amount of relatively inexpensive terpenic material incorporated therein, but oil-solubility is imparted to resins which, in the absence of the terpenic material, would be insoluble or difficultly soluble in vegetable oils. By such process, therefore, oil-soluble resins are obtained having an unusually high proportion of phenol-aldehyde condensate; in fact, except for the terpenic material, the resin may be composed entirely of phenol and aldehyde condensates. Oil-soluble resins can thus be obtained from inexpensive materials and without the aid of rosin and ester gum, which have for many years been relied upon to make oil-insoluble phenol-formaldehyde resins compatible with varnish oils; the more or less 100% phenol-aldehyde resins described in my applications above-referred to, like those which will be described hereinbelow can, however, be mixed with rosin, ester gum and other natural and synthetic resins.

I have found that better yields and an improved resin of lightness and permanence of color which is able to produce quick-drying varnishes, can be obtained by conducting the phenol-aldehyde-terpene condensation in two stages. In the first stage the phenol and aldehyde are caused to react in the presence of a relatively mild catalyst to produce an intermediate more or less resinous material. This initial condensation may or may not take place in the presence of the terpenic material which is to be incorporated in the resin; or only part of such terpenic material may then be present. After the initial condensation, the catalyst, especially if it is a non-volatile material, may be removed by washing or otherwise, after which further condensation is made to take place in the presence of the terpenic material and of a stronger catalyst. This latter catalyst is preferably aqueous or dry hydrochloric acid which remains in the reaction mass up to about 130° C. and is gradually expelled with increasing temperatures. Acid reacting chlorides may also be employed, such chlorides being removed as by washing with water, before the final heating of the resin to high temperatures (200–250° C.) to expel volatile uncombined material.

The invention will be illustrated in greater detail in the following examples:

*Example 1.*—An intermediate resin is obtained by the interaction of

|  | Parts |
|---|---|
| Butyl phenol | 100 |
| 40% formaldehyde solution | 100 |
| Dipentene | 30 |
| Zinc acetate | 0.25 to 2 |

(All parts by weight.)

The mixture is refluxed at the boiling point for about 16 hours, after which the aqueous layer is drawn off and the condensate heated to about 130° C. in order to dehydrate it. The mixture is then treated with

|  | Parts |
|---|---|
| Dipentene | 65 |
| Concentrated HCl (sp. gr. 1.19) | 65 | which brings the quantity of dipentene up to equimolecular proportions with respect to the butyl phenol. The hydrochloric acid contains about 35% of hydrogen chloride. The mixture is now heated for about 10 hours at 60 to 70° C. with constant stirring. A two-layer system results; the lower layer, consisting of a now more dilute hydrochloric acid, is drawn off. The upper layer, containing the resinous condensate, is heated to about 130° C., at which temperature hydrogen chloride begins to be eliminated. A moderate current of an inert gas is passed through the mass to aid the removal of volatile matter. The heating is continued up to a temperature of about 250° C. to expel uncombined volatile material. The yield is about 80–90% based on the total weight of phenol and dipentene, showing that a large proportion of the dipentene has become chemically bound in the resinous product. The heating is preferably continued until a product is obtained which is solid at room temperature and has an acid number of about 20. The acid number of a butyl phenol resin produced in a manner similar to the above-process, but in the absence of the terpene material, is about 70.

The resin is compatible with drying and non-drying varnish oils, and with synthetic and natural resins, and is soluble in the common solvents. It is particularly suited for the manufacture of quick-drying varnishes of pale color and non-yellowing properties.

*Example 2.*—An intermediate resin is produced by reacting the following materials (parts are by weight):

| | Parts |
|---|---|
| Phenol | 94 |
| 40% formaldehyde solution | 75 |
| Dipentene | 22 |
| Zinc acetate | 0.25 to 2 |

The mixture is condensed under reflux or pressure until a soluble resinous condensate is obtained. The water is then drawn off or distilled off at about 110° C. and the intermediate resin is treated with

| | Parts |
|---|---|
| Dipentene | 72 |
| Concentrated HCl | 100 |
| Toluol | 100 |

The mixture is heated with stirring for about 10 hours at a temperature of about 60 to 70° C. The proportion of formaldehyde to phenol is equimolecular; while the total weight of dipentene is equal to that of the phenol. The toluol acts as a diluent to facilitate handling of the viscous mass.

After the condensation the mass presents a two-layer system. The lower aqueous layer is drawn off and the upper layer is given one washing with water. It is then heated gradually to about 250° C. to remove uncombined matter and also the toluol. Hydrogen chloride begins to be expelled at about 130 to 150° C.; while free phenol and dipentene pass over at about 200–230° C. A very pale, hard resin is obtained having an acid value of about 25. The yield is about 90% based on the total weight of phenol and dipentene. The resin is soluble in varnish oils and produces quick-drying varnishes of high durability.

*Example 3.*—Employing the same intermediate resin as is obtained in Example 2, the amount of total dipentene used is increased to 136 parts, so that the proportion of dipentene to phenol is equimolecular. Following the same procedure as in Example 2, a resin is obtained in which again almost all of the dipentene is chemically bound in the phenolic condensate.

In place of the aqueous hydrochloric acid, gaseous hydrogen chloride can be introduced into the reacting mass during the same period of reaction. In general, it will be found that by operating under anhydrous conditions, in which case solid aldehyde will be employed in place of aqueous aldehyde, better yields and lower acid numbers can be obtained.

The process above-described is applicable with all kinds of phenols, including the higher homologues of phenol and also various substituted phenols and condensation products of phenols, including cresols, amyl and higher phenols, xylenols, paraphenylphenol, ketone-phenol condensates, such as acetone-phenol, various dioxydiphenyl- dialkyl- alkanes (methane, propane, etc.), and the like.

The reactions above-described will also take place when other terpenic material is employed in place of all or part of the dipentene, similar oil-soluble and pale resins being obtained. Thus, terpineol, pine oil, borneol, turpentine and other terpene hydrocarbons and substituted hydrocarbons or mixtures thereof, can be employed with very satisfactory results.

In the formation of the intermediate resin any known catalyst may be employed, preferably a relatively mild catalyst, like zinc acetate; but various other compounds of zinc, of the alkali and alkaline earth metals, and of other metals heretofore employed in the condensation of a phenol and an aldehyde, and also acids of various kinds, may be used. In the second stage of the reaction, however, relatively strong contact agents should be employed, and preferably strongly acid chlorides, including hydrogen chloride, zinc chloride, aluminum chloride, silicon tetrachloride, titanium tetrachloride, boron trichloride, etc. all of which are grouped under the expression "reactive chloride."

If desired, the terpenic material may be absent during the initial condensation of the phenol and aldehyde, in which case a suitable organic solvent is employed. The total amount of terpenic material is then added during the second stage of the reaction.

I claim:

1. A method of producing oil-soluble phenolic resins, which comprises reacting a phenol and formaldehyde in the presence of a relatively mild catalyst and of a terpenic material of the group consisting of dipentene, turpentine, borneol and terpineol, and continuing the condensation in the presence of an additional quantity of the terpenic material and of a stronger acidic inorganic chloride catalyst until a considerable part of the terpenic material has become chemically bound in the phenol-formaldehyde condensate.

2. The method of producing oil-soluble phenolic resins, which comprises reacting a phenol and an aldehyde in the presence of a relatively mild catalyst to the intermediate resinous stage, and then continuing the condensation in the presence of a terpenic material of the group consisting of dipentene, turpentine, borneol and terpineol, and of hydrochloric acid until a considerable part of the terpenic material has become chemically bound in the phenol-aldehyde condensate.

3. The method according to claim 2 wherein the terpenic material is dipentene.

4. The method according to claim 2 wherein the condensation takes place under substantially anhydrous conditions.

5. A method of producing oil-soluble phenolic resins, which comprises reacting a phenol and formaldehyde in the presence of a catalyst and of a terpenic material of the group consisting of dipentene, turpentine, borneol and terpineol, and subsequently continuing the reaction with the terpenic material at higher temperatures in the presence of hydrochloric acid.

6. The method of producing oil-soluble resins, which comprises condensing a phenol and formaldehyde in the presence of zinc acetate and a terpenic material of the group consisting of dipentene, turpentine, borneol and terpineol, removing the acetate, adding a further quantity of the terpenic material and continuing the condensation at higher temperatures in the presence of hydrochloric acid.

7. The method of producing oil-soluble phenolic resins, which comprises reacting a phenol and an aldehyde in the presence of a terpenic material of the group consisting of dipentene, turpentine, borneol and terpineol, and of a catalyst, to the intermediate resinous stage, and subsequently adding an acid-reacting inorganic chloride to the condensate so-obtained and continuing the reaction with the terpenic material in the presence of such chloride.

8. The method of producing oil-soluble resins, which comprises condensing a phenol and formaldehyde in the presence of zinc acetate and dipentene, removing the acetate, adding a further quantity of the terpenic material and continuing the condensation at higher temperatures in the presence of hydrochloric acid.

ISRAEL ROSENBLUM.